US007668191B2

(12) United States Patent
Steinback et al.

(10) Patent No.: US 7,668,191 B2
(45) Date of Patent: Feb. 23, 2010

(54) APPARATUS AND METHOD FOR DETERMINING TRANSMISSION POLICIES FOR A PLURALITY OF APPLICATIONS OF DIFFERENT TYPES

(75) Inventors: Eckehard Steinback, Olching (DE);
Svetoslav Duhovnikov, Munich (DE);
Shoaib Khan, Munich (DE); Marco Sgroi, Berkeley, CA (US); Wolfgang Kellerer, Fürstenfeldbruck (DE)

(73) Assignee: NTT DoCoMo, Inc., Tokyo (JP)

( * ) Notice: Subject to any disclaimer, the term of this patent is extended or adjusted under 35 U.S.C. 154(b) by 490 days.

(21) Appl. No.: 11/638,836

(22) Filed: Dec. 13, 2006

(65) Prior Publication Data

US 2007/0180134 A1    Aug. 2, 2007

(30) Foreign Application Priority Data

Dec. 14, 2005    (EP)    ................................. 05027400

(51) Int. Cl.
*H04J 3/16* (2006.01)
*H04L 12/28* (2006.01)
*H04W 72/00* (2009.01)

(52) U.S. Cl. ..................... 370/437; 370/431; 455/450; 455/452.2

(58) Field of Classification Search ................. 370/310, 370/437; 455/69, 452.2, 512, 266, 450
See application file for complete search history.

(56) References Cited

U.S. PATENT DOCUMENTS 6,404,738 B1    6/2002    Reininger et al.

6,690,649 B1    2/2004    Shimada (Continued)

FOREIGN PATENT DOCUMENTS

JP    11-215183    8/1999

(Continued)

OTHER PUBLICATIONS

English translation of Japanese Office Action dated Dec. 5, 2008.

(Continued)

*Primary Examiner*—Dwayne Bost
*Assistant Examiner*—Michael Mapa
(74) *Attorney, Agent, or Firm*—Nutter McClennen & Fish LLP; John J. Penny, Jr.

(57) ABSTRACT

An apparatus for determining transmission policies for a plurality of transmissions of different types based on a first transmission data associated to a first transmission being of a first transmission type, and on a second transmission data associated to a second transmission being of a second transmission type is described, comprising means for obtaining a first score within a common range, said first score being based on an evaluation of said first transmission data in a first transmission type specific manner, means for obtaining a second score within the common range, said second score being based on an evaluation of said second transmission data in a second transmission type specific manner, and means for determining, based on said obtained first and second score, for said first and second transmission a respective first and second transmission policy each defining one or more transmission parameters such that a sum of a first and second expected score is maximized.

17 Claims, 11 Drawing Sheets

U.S. PATENT DOCUMENTS

2003/0013451 A1* 1/2003 Walton ................ 455/447
2004/0160979 A1* 8/2004 Pepin et al. ........... 370/462
2006/0236358 A1* 10/2006 Liu et al. ............. 725/117

FOREIGN PATENT DOCUMENTS

| JP | 11215183 A | 8/1999 |
| JP | 11-341008 | 12/1999 |
| WO | WO 00/33511 | 6/2000 |
| WO | WO-2004/025405 | 3/2004 |

OTHER PUBLICATIONS

Liu, Xin et al., "Transmission Scheduling for Efficient Wireless Utilization," IEEE Infocom 2001, pp. 776-785.

Tsibonis, V. et al., "Exploiting Wireless Channel State Information for Throughput Maximization," IEEE Infocom 2003.

Peng, Y. et al., "Adaptive Resource Allocation and Frame Scheduling for Wireless Multi-user Video Streaming" (Sep. 2005).

Khan, S. et al., "Cross-Layer Optimization for Wireless Video Steaming—Performance and Cost" (Jul. 2005).

Ivanovich, M. et al., "Measuring Quality of Service in an Experimental Wireless Data Network" (Dec. 2003).

Ivrlac, M.T., "Parameter Selection for the Gilbert-Elliott Model," Technical Report No. TUM-LNS-TR-03-03, Munch University of Technology, Institute for Circuit Theory and Signal Processing, pp. 1-7 (May 2003).

European Search Report dated Jun. 1, 2006.

Office Action (issued in Chinese Patent Application No. 200610130943.1) dated Jun. 19, 2009.

* cited by examiner

APPARATUS AND METHOD FOR DETERMINING TRANSMISSION POLICIES FOR A PLURALITY OF APPLICATIONS OF DIFFERENT TYPES

CROSS-REFERENCE TO RELATED APPLICATION

This application claims priority from European Patent Application No. 05027400.0, which was filed on Dec. 14, 2005 and is incorporated herein by reference in its entirety.

BACKGROUND OF THE INVENTION

1. Field of the Invention

The present invention relates to the field of optimization of wireless network architectures and resource allocations.

2. Description of the Related Art

Optimization of network architectures is critical to achieve maximal network capacity and provide high quality services to the largest possible number of users. In common scenarios, multiple users share the wireless medium and engage in rather diverse applications such as video, voice, and FTP delivery. Optimizing allocation of resources across all users and applications maximizes the satisfaction of the users.

So far cross-layer optimization has been applied only to single application systems. However, in practice multiple users sharing the wireless medium, e.g. in a cell, often run different applications simultaneously. User satisfaction translates into a different set of requirements for each type of application. Furthermore, the impact of losses on the user-perceived quality is highly application-dependent.

The challenge of optimization across multiple applications has been treated mainly in the form of throughput maximization as described by V. Tsibonis, L. Georgiadis, L. Tassiulas, in "Exploiting wireless channel state information for throughput maximization," IEEE INFOCOM 2003, in the following referred to as [Tsi01], and by Xin Liu, E. Chong, N. Shroff, in "Transmission scheduling for efficient wireless utilization," IEEE INFOCOM 2001, in the following referred to as [Liu01].

Maximizing throughput leads to optimum performance only for applications, which are insensitive to delay, and packet loss. Multimedia applications such as video and voice are highly sensitive to changes in data rate, delay, and packet losses. Even the importance of a packet changes dynamically depending on the history of previous packets. Due to these reasons, throughput maximization leads to performance, which is usually not optimal with respect to user perceived quality for multimedia applications.

WO 00/33511 A describes a system for improving the end-user quality of service in a packet switched network. Reports are sent from various nodes in the network informing a network supervisor of the end-user quality of service at the node, which represents an estimate of the quality from a human end-user's perspective. The quality supervisor analyzes the reports and sends commands to the node, which sent the report and/or to other nodes in order to improve the end-user quality of service at the node and in the packet switch network as a whole. The nodes comprise sending and receiving terminals, routers and gateways. The reports include measurements of link parameters, device parameters and end-user quality of service.

SUMMARY OF THE INVENTION

It is an object of the present invention to provide an apparatus and a method for determining transmission policies for a plurality of applications of different types considering user perceived quality for said applications.

In accordance with a first aspect, the present invention provides an apparatus for determining transmission policies for a plurality of applications of different types based on a first transmission data associated to a first transmission being of a first transmission type, on a second transmission data associated to a second transmission being of a second transmission type, having: means for obtaining a first score within a common range, a said first score being based on an evaluation of said first transmission data in a first transmission type specific manner; means for obtaining a second score within the common range, said second score being based on an evaluation of said second transmission data in a second transmission type specific manner; and means for determining, based on said obtained scores, for said first and second transmission, a respective first and a second transmission policy, each defining one or more transmission parameters such that a sum of said first expected score and said second expected score is maximized.

In accordance with a second aspect, the present invention provides a method for determining transmission policies for a plurality of transmissions of different types based on a first transmission data associated to a first transmission being of a first transmission type, on a second transmission data associated to a second transmission being of a second transmission type, having the following steps; obtaining a first score with a common range, said first score being based on an evaluation of said first transmission data in a first transmission type specific manner; obtaining a second score within the common range, said second score being based on an evaluation of said second transmission data in a second transmission type manner; and determining, based on said assigned first and second score, for the first and second transmission a respective first and second transmission policy defining one or more transmission parameters such that a sum of a first expected score and second expected score for a consecutive transmission interval is maximized.

In accordance with a third aspect, the present invention provides a computer program having a program code for performing the above-mentioned method, when the program runs on a computer.

The present invention is based on the finding that jointly optimizing the system for different users and applications requires: first, defining a common metric that quantifies the satisfaction of the user for the service delivery and, second, mapping network and/or application parameters onto this metric.

Said common metric is also referred to as score within this description, wherein said score is defined for a common range with a common minimum score and a common maximum score, wherein common is defined in the sense of being common for all transmissions and transmission types.

The invention provides a cross-layer optimization framework, the aim of which is to maximize user satisfaction. The challenge of the inventive approach lies in the problem of quantifying user satisfaction with respect to system parameters such as throughput, delay, packet error rate, etc.

In a preferred embodiment a Mean opinion Score (MOS) is used as said score and common performance metric for the optimization. Despite the fact that the following discussion will be based on the Mean Opinion Score (MOS) it should be noted that the present invention comprises the usage of other scores; other scores with a common range different to the Mean Opinion Score (MOS) which consider the user perceived quality of transmission are also possible.

The Mean Opinion Score (MOS) was originally proposed for voice quality assessment and provides a numerical measure of the quality of human speech at the destination end of the circuit. The scheme uses subjective tests (opinionated scores) that are mathematically averaged to obtain a quantitative indicator of the system performance. To determine Mean Opinion Score (MOS), a number of listeners rate the quality of test sentences read aloud over the communications circuit by a speaker. A listener gives each sentence a rating as follows: (1) bad; (2) poor; (3) fair; (4) good; (5) excellent, The Mean Opinion Score (MOS) is the arithmetic mean of all the individual scores, and can range from 1 (worst) to 5 (best).

For other applications, such as video, web browsing and file download, the same scale of Mean Opinion Score (MOS), which reflects the user perceived quality of the application is used. This now enables one to optimize across applications using a common optimization metric. The objective function can be chosen, e.g., to be the average Mean Opinion Score (MOS) of all the users or of all transmissions:

$$F(\tilde{x}) = \frac{1}{K}\sum_{k=1}^{K} w_k \cdot MOS_k(\tilde{x}) \quad (1)$$

where $F(\tilde{x})$ is the objective function with the cross-layer parameter tuple $\tilde{x}\epsilon\tilde{X}$. $\tilde{X}$ is the set of all possible parameter tuples abstracted from the protocol layers. $w_k$ is the relative importance of the user or transmission as determined by the service agreement between the user and the service provider.

The decision of the means for determining, in the following also referred to as optimizer, can be expressed as:

$$\tilde{x}_{opt} = \underset{\tilde{x}\in\tilde{X}}{\arg\max} F(\tilde{x}) \quad (2)$$

where $\tilde{x}_{opt}$ is the optimum parameter tuple, which maximizes the objective function. Once the optimizer has selected the optimal values of the parameters, it distributes them to all the individual layers, which are responsible for translating them back into actual modes of operation.

Using scores with the common scale or common range— having the same minimum score and the same maximum score—as the optimization parameter provides various advantages. First, as the user perceived quality of the service or application is now provided on the same scale or range, which is common to all transmission Or application types, one can take advantage now of the diversity at the application layer, for example, by using different source codecs (CODEC=Encoding/Decoding), in addition to the diversity at the physical layer, for example, by using different channel codecs and different modulation schemes, Thus, all possible transmission scenarios comprising all applications and their possible transmission parameters can be calculated and compared to each other based on transmission scenario specific scores. Said scenario specific score can be the sum of all said "transmission individual" scores or the arithmetic mean of all said "transmission individual" scores. The task of the means for determining or the optimizer is now to maximize the sum or the arithmetic mean of all individual treating all application or transmission "equally", Abstracting, for example, the application and physical layer parameters to said user perceived quality score provides an effective means to optimize the allocation of network or radio resources and at the same time taking into account real-time and latency requirements of applications like voice and video streaming. Second, using a score within a common range facilitates to prioritize specific users or applications and/or to provide for a fair allocation of network and radio resources, for example, based on the history of scores for each application or user.

A more detailed description of a basic cross-layer optimization approach, the principle of parameter abstraction and the formulation of objective functions for multi-user cross-layer optimization is provided by Y. Feng, S. Khan, E. Steinbach, M. Sgroi, W. Kellerer, in "Adaptive resource allocation and frame scheduling for wireless multi-user video streaming," IEEE International Conference on Image Processing, ICIP'05, Genova, Italy, September 2005, in the following referred to as [Pen01], and by S. Khan, M. Sgroi, E. Steinbach, and W. Kellerer, "Cross-layer optimization for wireless video streaming—performance and cost," IEEE International Conference on Multimedia & Expo, ICME 2005, Amsterdam, July 2005, in the following referred to as [Kha01].

BRIEF DESCRIPTION OF THE DRAWINGS

These and other objects and features of the present invention will become clear from the following description taken in conjunction with the accompanying drawings, in which.

DESCRIPTION OF THE PREFERRED EMBODIMENTS

Figure 1A:
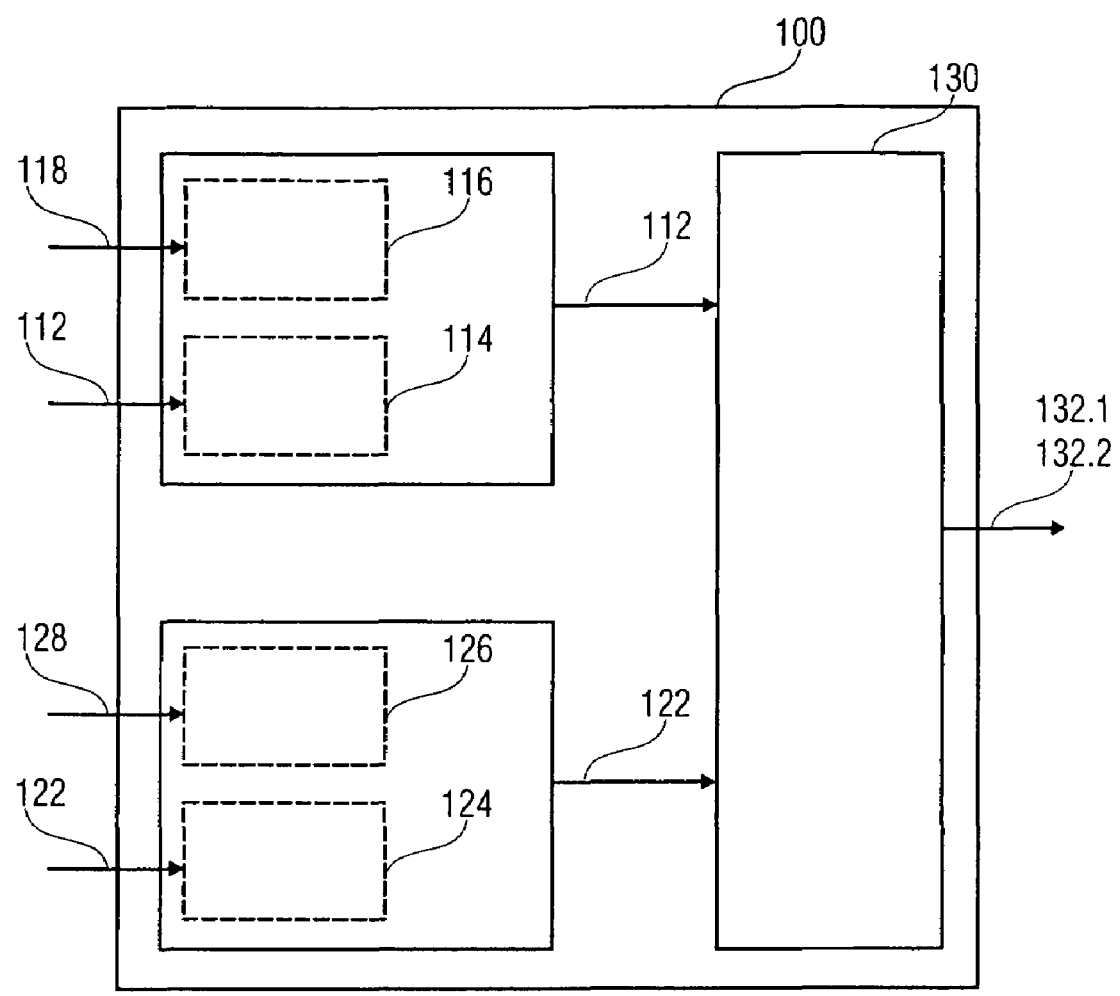
FIG. 1A is an embodiment of an inventive apparatus.

FIG. 1A shows an embodiment of an inventive apparatus 100 comprising a means 110 for obtaining a first score within a common range, a means 120 for obtaining a second score within the common range and a means 130 for determining a transmission policy. The means 110 for obtaining a first score 112 within a common range, said first score 112 being based on an evaluation of a first transmission data associated to a first transmission being of a first transmission type, wherein the evaluation is performed in a first transmission type specific manner. The means 110 for obtaining said first score 112 outputs said first score 112 to said means 130 for determining. Means 120 for obtaining a second score 122 within the common range is operative to obtain said second score 122 and to output said second score 122 to the means 130 for determining, wherein said second score 122 is based on an evaluation of a second transmission data associated to a second transmission being of a second transmission type, wherein the evaluation is performed in a second transmission type specific manner.

Said means 130 for determining is operative to receive said first score 112 and said second score 122 and to determine, based on said scores 112, 122, for the said first and second transmission a respective first and second transmission policy 132, wherein each transmission policy defines one or more transmission parameters such that a sum of expected scores is maximized.

In one embodiment of the inventive apparatus 100 the means for obtaining 110, 120 are operative to use one or more respective expected scores of previous maximization steps for deriving said first or second score. In this case the apparatus is adapted to operate without feedback of other entities, e.g. receivers.

In another embodiment of the inventive apparatus 100 the means for obtaining 110, 120 comprise a means 114, 124, respectively, for receiving said first score 112 or said second score 122 from an apparatus the first or second transmission data has been transmitted to, wherein said means means 114, 124 for receiving are optional and are shown in broken lines in FIG. 1A.

In a further embodiment of the inventive apparatus 100 said means for obtaining 110, 120 comprise a respective means 116 and 126, for deriving said first score 112 or second score 122 from a first transmission property 118 or second measured transmission property 128 which, for example, can be received from an apparatus the first or second transmission data has been transmitted to, wherein said means means 116, 126 for receiving are optional and are shown in broken lines in FIG. 1A. The measured transmission properties 118, 128 can, for example, be a transmission rate, a signal to noise ratio (SNR) or a packet error probability (PEP), wherein the latter can be, for example, estimated based on the signal to noise ratio.

In an alternative embodiment of the inventive apparatus 100 said means 110, 120, 130 can be merged to one means.

Alternative embodiments of the inventive apparatus 100 can comprise more than two means 110, 120 for obtaining a score, wherein the means for obtaining can be operative to obtain a third, fourth, etc. score based on an evaluation of transmission data in a third, fourth, etc. application type specific manner, wherein the third, fourth, etc. transmission data can be associated to a third, fourth, etc transmission type.

Another embodiment of the inventive apparatus 100 may comprise instead of two separate means 110, 120, one shared means for obtaining, wherein the shared means for obtaining is operative to obtain a first or second score based on an evaluation of transmission data in a first or second transmission type specific manner depending on whether the transmission data is associated to a first or a second transmission type.

Figure 1B:
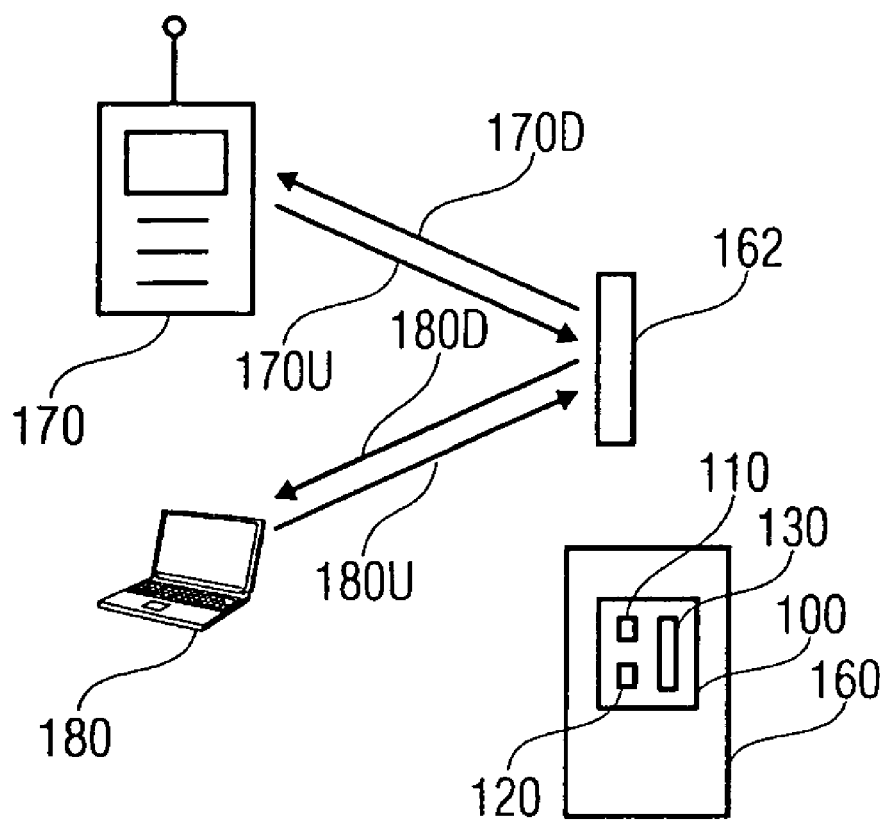
FIG. 1B is an exemplary network scenario with a base station comprising an inventive apparatus.

FIG. 1B shows an exemplary network scenario with a base station 160, a first terminal 170 and a second terminal 180, The base station 160 comprises an inventive apparatus 100 and an antenna 162, which is connected to the inventive apparatus 100.

FIG. 1B shows a scenario wherein first transmission data associated to said first transmission being of a first transmission type is transmitted between the first terminal 170 and the base station 160, either on-link 170D or up-link 170U or both. Accordingly, second transmission data associated to a second transmission being of a second transmission type is transmitted between the second terminal 180 and the base station 160, either down-link 180D or up-link 180U, or both.

In the following different scenarios for obtaining said score will be discussed based on the transmission between said first terminal 170 and said base station 160, wherein the following explanations can also be applied to the second transmission between the second terminal 180 and said base station 160 or any other terminal.

In a downlink scenario, said base station 160 transmits first transmission data downlink 170D to the first terminal 170. The first terminal 170 receives the first transmission data and can measure, for example, the actual signal to noise ratio (SNR) of the received transmission data.

The first terminal 170 can be operative, for example, to transmit uplink 170U the transmission property of the received first transmission data, i.e. the actual signal to noise ratio of the received first transmission data, to said base station, or to be more precise, to said means 110 for obtaining a first score, or can be operative to derive said first score itself from said first transmission property and transmit said first score up-link 170U to said base station 160 or means 110 for obtaining a first score.

In an up-link scenario, the first transmitter 170 transmits first transmission data uplink 170U to the base station 160. The base station 160, or to be more precise the means 110 for obtaining can itself determine such transmission property of the first transmission data and directly derive thereof the first score 112.

Based on the obtained scores, for example, the first and second score 112, 122, the means 130 determines a respective first and second transmission policy (132.1; 132.2) and defines for the first and the second transmission said one or more transmission parameters such that said sum of said first and said second expected score is maximized for a transmission in a consecutive transmission interval.

For the afore-mentioned downlink transmission scenario 170D the base station 160 will transmit said first transmission data in said consecutive transmission interval based on the determined transmission parameters.

For the latter scenario, the uplink scenario 170U, the base station 160 transmits said determined first transmission policy downlink to the first terminal 170, which will then transmit first transmission data in a consecutive transmission interval based on said first transmission policy received from said base station 160.

Said transmission properties can, for example, be transmitted from said first terminal 170 using a dedicated signalling channel or can be "piggy-backed" onto, for example, acknowledge messages.

The term transmission data associated to a transmission being of a certain transmission type comprises transmission of data of applications like voice, hyper-text transfer protocol (HTTP), file transfer protocol (FTP), video and music streaming and other applications, but also comprises the transmission of signalling data or any other data, for example, used to control the network.

In typical wireless or mobile network scenarios, base stations control the radio resources within their cells, thus, said inventive apparatus for determining transmission policies for a plurality of applications of different types is-typically implemented in said base stations. Nevertheless, in alternative scenarios like ad-hoc networks, any other device, for example, a communication device, may be charged with the task to and/or optimize the radio resources. For such cases, said inventive apparatus can also be implemented in other devices for an optimization or maximization of the user perceived quality of services and applications.

Figure 1C:
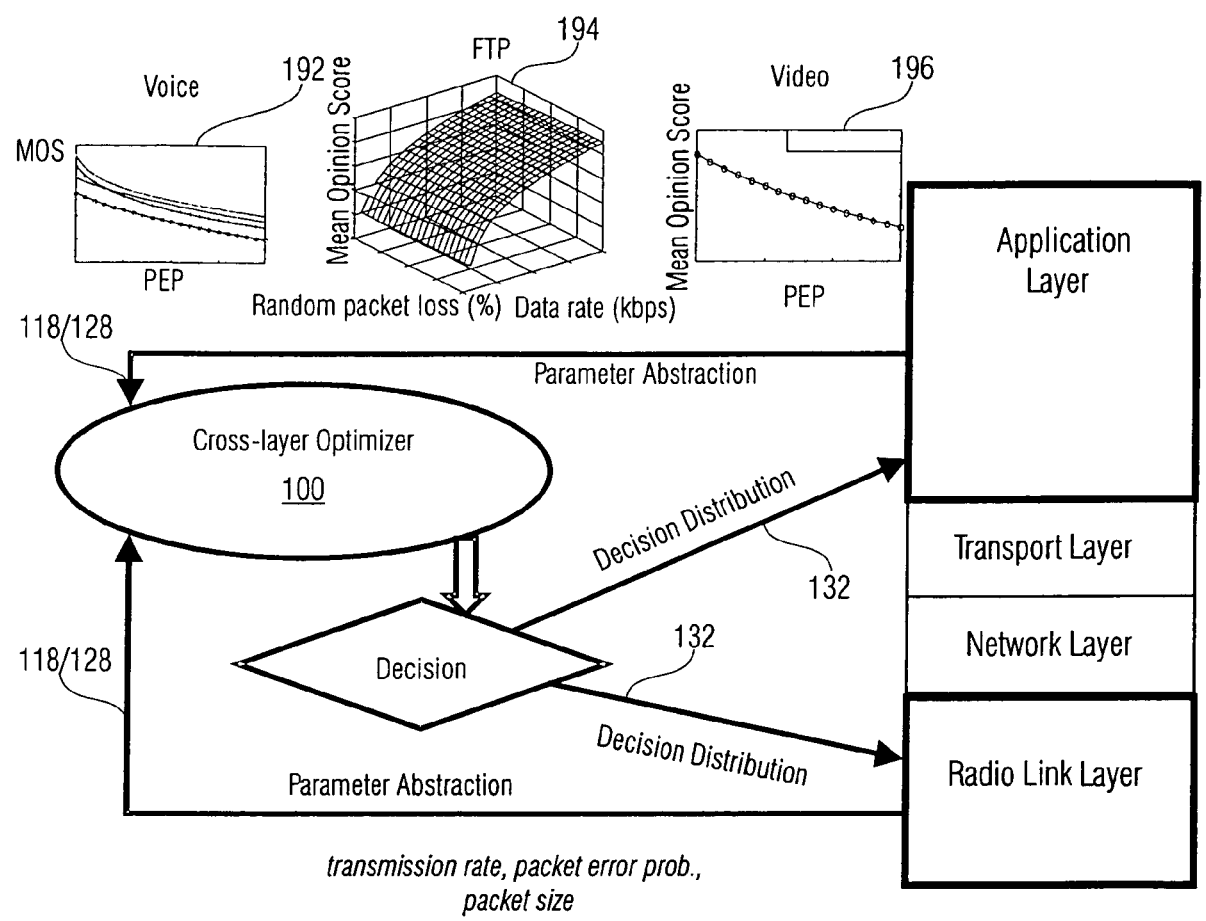
FIG. 1C is a diagram for a multi-application, cross-layer optimization.

In the following, it will be shown that the inventive optimization framework achieves significant improvement in terms of user perceived quality for an exemplary implementation with three application types, with real-time voice, file download and video conferencing, as shown in FIG. 1C.

FIG. 5C shows a diagram for an exemplary multi-application, cross-layer optimization set-up, comprising an inventive apparatus 100, in FIG. 1C referred to as cross-layer optimizer, which receives transmission properties 118, 128 like transmission rate, packet error probability (PEP) and/or packet size as transmission properties from the radio link layer.

The cross-layer optimizer, i.e. inventive apparatus 100, is operative to derive said score, in FIG. 1C a Mean Opinion Score (MOS), from said transmission properties based on predefined look-up tables or predefined algorithms. The inventive apparatus 100 according to FIG. 1C uses a look-up table 192 for deriving said Mean Opinion Score for voice based on said packet error probability (PEP), uses an look-up table 194 for deriving said Mean Opinion Score for FTP based on random packet loss rate (%) and data rate (kbps), and uses a video lookup-table 196 for deriving a Mean Opinion Score for video based on a packet error probability (PEP). The look-tables 192, 194, and 196, or in more general the relation between the Mean Opinion Score and the transmission properties or parameters will be explained later in more detail.

Based on the obtained scores for each voice transmission, each FTP transmission and each video transmission said means for determining of the inventive apparatus determines for each of the voice transmissions, FTP transmissions, and video transmissions a respective transmission policy 132, and distributes the decision, i.e. the optimum transmission policy to various layers, in FIG. 1C to the application layer and the radio link layer.

The traditional method of determining voice quality is to conduct subjective tests with panels of human listeners. The results of these tests are averaged to give Mean Opinion Score (MOS) but such tests are expensive and are impractical for online voice quality assessment. For this reason the ITU has standardized a new model, Perceptual Evaluation of Speech Quality (PESQ), an algorithm that predicts with high correlation the quality scores that would be given in a typical subjective test. This is done by making an intrusive test and processing the test signals through PESQ.

PESQ measures one-way voice quality: a signal is injected into the system under test, and the degraded output is compared by PESQ with the input (reference) signal. Mapping between Mean Opinion Score (MOS) and user satisfaction is presented in FIG. 1D.

Figures 1D, 2:
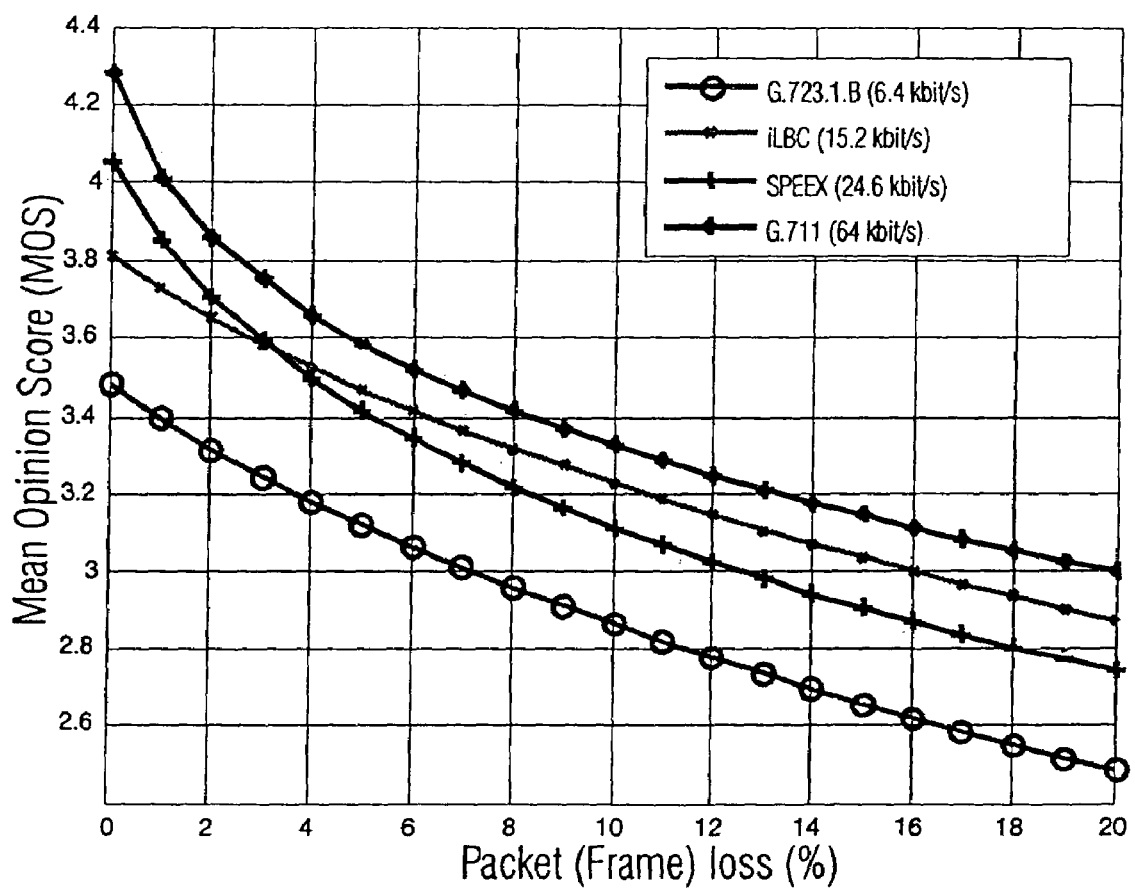
FIG. 1D is a diagram explaining the relation between the Mean Opinion Score (MOS) and user satisfaction.
FIG. 2 is a diagram depicting a Perceptual Evaluation of Speech Quality (PESQ) based Mean Opinion Score (MOS) versus packet loss for different voice codecs.

The PESQ algorithm is computationally too expensive to be used in real-time scenarios. To solve this problem a model is proposed to estimate Mean Opinion Score (MOS) with a few parameters, which are easy to compute—packet error probability and available bit rate. The available rate determines the voice codec that can be used. In FIG. 2 experimental curves for Mean Opinion Score (MOS) estimation as a function of packet error probability for different voice codecs are shown. The curves are drawn using an average over a large number of voice samples and channel realizations (packet loss patterns). These curves can be stored in the base station for every codec that is supported. If transcoding from an unsupported codec is required, such curves can be signalled to the base station as side information, To estimate FTP user satisfaction a logarithmic MOS-throughput relationship as introduced by A. Saliba, M. Beresford, M. Ivanovich and P. Fitzpatrick, in "Measuring Quality of Service in an Experimental Wireless Data Network," Australian Telecommunication Networks and Applications Conference, Melbourne, Australia, December 2003, in the following [Sa101], is used. It is assumed that every user has subscribed for a given data rate and his satisfaction is characterized by the real rate he receives. The Mean Opinion Score (MOS) is estimated based on the current rate offered to the user by the system and the packet loss rate:

$$MOS = a * \log_{10}[b * R * (1-PEP)] \quad (3)$$

If a user has subscribed for bandwidth R and receives bandwidth R, then in case of no packet loss his satisfaction on the Mean Opinion Score (MOS) scale should be maximum, i.e. 4.5. On the other end, a minimum bandwidth is defined that can be offered to the user and assign to it a Mean Opinion Score (MOS) value of 1. Using the parameters a and b, a logarithmic curve for the estimated Mean Opinion Score (MOS) is fitted. Varying the packet error probability (PEP), this model results in the Mean Opinion Score (MOS) estimation surface of FIG. 3 for every user with a contracted rate of, for example 192 kbps.

Figure 3:
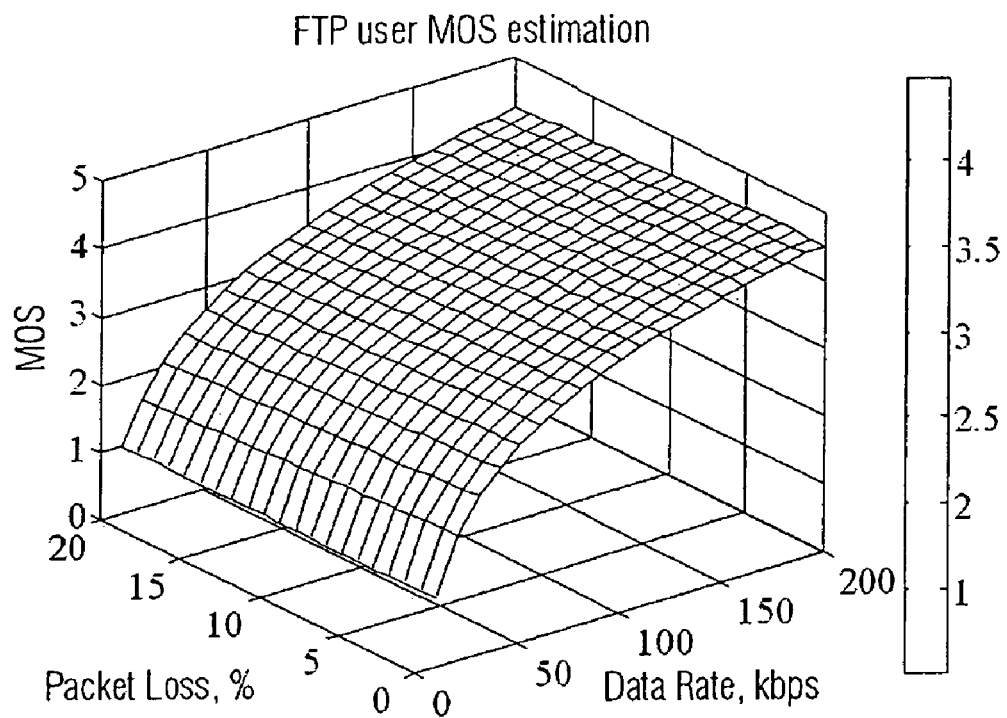
FIG. 3 is a diagram of a file transfer protocol (FTP) user Mean Opinion Score (MOS) estimation surface versus packet loss and data range.

The fitting of the parameters a and b is, for example, done in a such a manner, that for a 192 kbps ftp service as shown in FIG. 3, the maximum MOS of 4,5 is obtained when the user receives the subscribed bandwidth of 192 kbps without packet loss, and the minimum MOS of 1 is obtained when the user's actual bandwidth is 0 kbps. The actual parameters were chosen as follows: a=2.6902 and b=0,2452/kbps.

To support video-conferencing or real-time video in the wireless multimedia network a simple model for evaluating the quality of a video material is introduced. It is assumed that all the information about the distortion caused by a slice loss is known and the Peak Signal to Noise Ratio (PSNR) for different slice loss percentages is evaluated. The model is constructed for the Foreman video sequence, a standard video sequence for benchmarks, but can be easily extended for different videos.

Figure 4A:
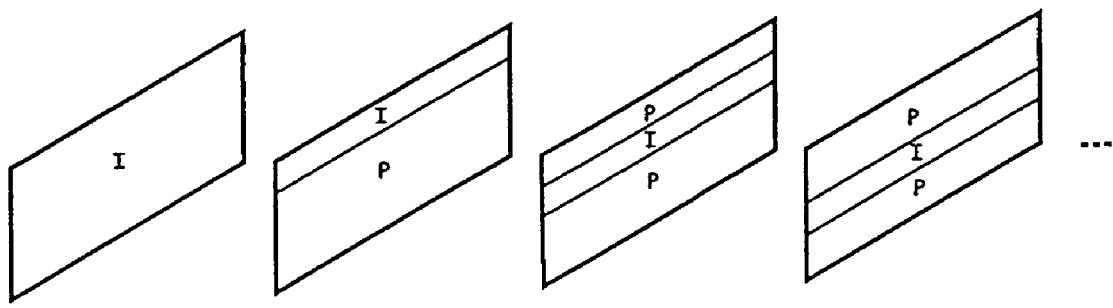
FIG. 4A is an H.264 based exemplary encoding of video sequences for conversational video applications.

Encoding and decoding is performed with the H.264 JM 8.4 codec. The encoder is set to encode the first frame as an I-frame and all the following frames as P-frames. Nine slices per frame are assumed and in every frame, the macroblocks of a single slice are intra coded (FIG. 4A).

This results in a higher bit-rate, but also gives higher resilience against lost packets (slices). If a slice is lost, the effect of this loss will be washed out after a maximum of nine frames, Resulting average PSNR over all 400 frames for zero percent packet loss is 35.30 dB in our experiment.

Figure 4B:
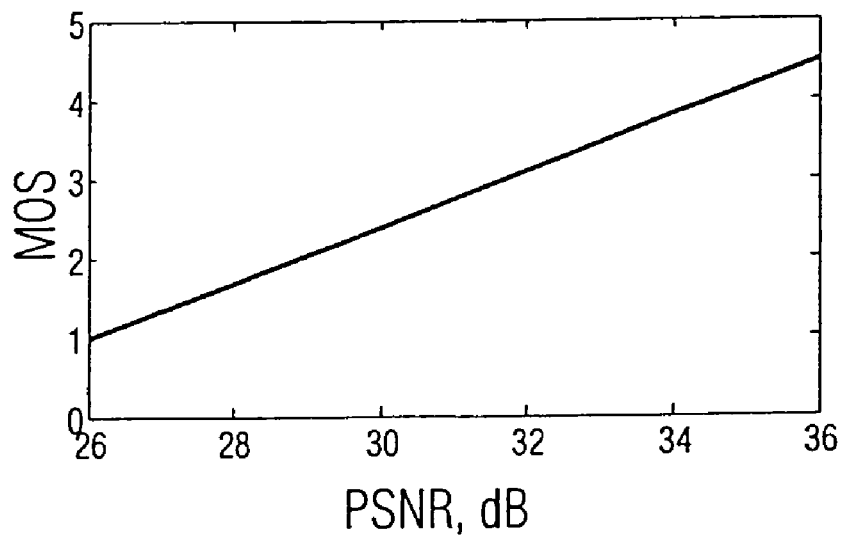
FIG. 4B is a diagram depicting a video user Mean Opinion Score (MOS) versus peak signal to noise ratio (PSNR)
Figure 4C:
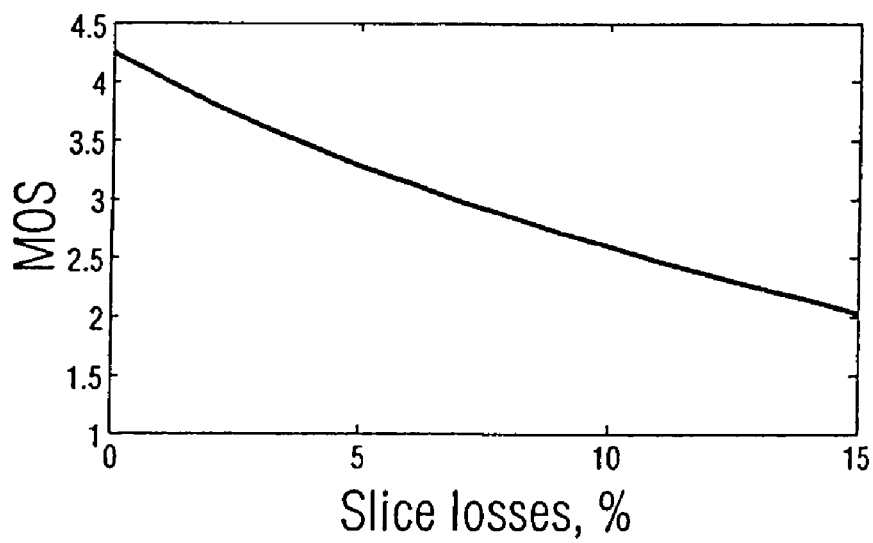
FIG. 4C is a diagram depicting a video user Mean Opinion Score (MOS) versus slice losses for a foreman video sequence.

FIG. 4B proposes the relation between the decoded average PSNR and user satisfaction measured with the metric Mean Opinion Score (MOS). FIG. 4C shows the average Mean opinion Score (MOS) in case there are packet losses over the wireless channel. Every slice is encapsulated into one packet. Every % slice loss is simulated 1000 times with random slice loss patterns. The average decoded PSNR is computed over all the decoded frames. Slice or frame concealment is used and expected peak signal to noise (PSNR) and Mean Opinion Score (MOS) is measured.

For the application-driven cross-layer optimization three sets of users are defined: U—requesting voice service, V—file download and W—videoconference. Depending on the service, the mobile users require different resources over the wireless channel. This depends on the channel code rate and the set of transmission rates that can be offered to the user. This is referred to as transmission policy. For example a user requesting voice service may be served with different voice codecs (G.711, Speex, iLBC (Internet Low Bit-rate Codec) or G.723.1.B in our example) and this data may be encoded with different channel code rate ½, ⅓, or ¼ in our example. Every transmission policy gives different quality of service to the user and requires different amount of channel resources.

Sets of transmission policies are created for every service. $T_U$ is the set of transmission policies for voice service, $T_V$ is the set of transmission policies for the file download service, and $T_W$ is the set of transmission policies for the video service.

The goal of this optimization, the Mean Opinion Score maximization is to achieve maximum user satisfaction and fairness among the users. For every user, depending on the service, a decision variable for every transmission policy is defined—whether this user is served with a given transmission policy or not. Consequently these decision variables are of Boolean type, i.e. either the user transmits its information using this policy or not. For the voice users, the decision variables are $u_{ij}$, where "i" denotes the i-th user and "j" denotes the transmission policies available for the voice users. The next step is to associate an expected user QoS defined with Mean Opinion Score (MOS).

Every user in the wireless network has a different position and mobility, which results in variable receiver SNR. Based on the receiver SNR, an estimation on the packet error probability (PEP) can be obtained for different modulation schemes (BPSK-Sinary Phase Shift Keying and QPSK-Quartenary Phase Shift Keying) and different channel code rates, i.e. for all transmission policies as described by M. T. Ivrlac, "Parameter selection for the Gilbert-Elliott model," Technical Report TUM-LNS-TR-03-05, Institute for Circuit Theory and Signal Processing, Munich University of Technology, May 2003, in the following referred to as [Ivr01]. A channel realization is generated and the estimation of the packet error probability (PEP) is performed for all the transmission policies given the particular received SNR.

The objective function for a multi-user multi-application cross-layer optimization is defined in equation (4). A maximization of the sum of the QoS (MOS) perceived by every user in the multimedia wireless network has to be achieved. The parameter λ is used to give higher priority to a given user and it is up to the network operator to choose its value.

$$\text{Maximize} \sum_{i \in U} \sum_{j \in T_u} \lambda_{ui} u_{ij} E[MOS_{ij}] + \quad (4)$$

$$\sum_{i \in V} \sum_{j \in T_v} \lambda_{vi} v_{ij} E[MOS_{ij}] + \sum_{i \in W} \sum_{j \in T_w} \lambda_{wi} w_{ij} E[MOS_{ij}]$$

Subject to:

$$\sum_{j \in T_u} u_{ij} = 1, \forall i \in U \quad (5)$$

$$\sum_{j \in T_v} v_{ij} = 1, \forall i \in V \quad (6)$$

$$\sum_{j \in T_w} w_{ij} = 1, \forall i \in W \quad (7)$$

$$\sum_{i \in U} \sum_{j \in T_u} r_{ij} u_{ij} + \sum_{i \in V} \sum_{j \in T_v} r_{ij} v_{ij} + \sum_{i \in W} \sum_{j \in T_w} r_{ij} w_{ij} \leq TotalSymbolRate \quad (8)$$

In the described example, every user must be associated with a given transmission rate, channel code rate and modulation scheme. The decision variables $u_{ij}$, $v_{ij}$ and $w_{ij}$ are of Boolean type, which means that the sum of all decision variables for a single user must be equal to one, see equations (5) to (7). The total available symbol rate for all the users is constrained to be less than the total symbol rate of the system. Every transmission policy has an associated symbol rate $r_{ij}$ and the sum of all individual symbol rates must be less or equal to the total symbol rate, see equation (8).

In a preferred embodiment a parameter λ is inserted to ensure a fair allocation of resources. The optimizer tries to find a resource allocation, which maximizes the user satisfaction based on Mean Opinion Score (MOS), and this in general is the goal of every network operator. In this case there is a possibility that even though the system performance is maximized, a given user is not satisfied. This could be caused by low receiver SNR and the optimizer can decide to allocate the resources to the other users. This contradicts with the fairness that shall be offered to the users independent of their location. To solve this problem a scaling coefficient λ based on the history of the user estimated QoS is selected. On every rate allocation procedure, the user with maximum average of the estimated QoS for the previous steps is found assuming that one is at rate allocation step "j" and K number of users are in the system, the value of the maximum perceived QoS by a single user is found by $$\text{Max} MOS_j = \frac{1}{j-1} \max \left( \sum_{i=1}^{j-1} MOS_{1i}; \sum_{i=1}^{j-1} MOS_{2i}; \ldots; \sum_{i=1}^{j-1} MOS_{Ki} \right) \quad (9)$$

or introducing k as user or transmission index:

$$\text{Max} MOS_j = \frac{1}{j-1} \max \left( \sum_{i=1}^{j-1} MOS_{1i}; \ldots; \sum_{i=1}^{j-1} MOS_{ki}; \ldots; \sum_{i=1}^{j-1} MOS_{Ki} \right) \quad (9)$$

The λ for every user or transmission is calculated with $$\lambda_{kj} = \frac{MaxMOS_j}{\sum_{i=1}^{j-1} MOS_{ki}}, k = 1 \ldots K \quad (10)$$

The user with the maximum perceived QoS has a scaling coefficient of one. The other users have scaling coefficients in the range. [1; 4.5], because the denominator is also bounded in the interval [1; MaxMOS$_j$]. This is important for preserving the stability of the optimization algorithm. Since these λ values scale the estimated Mean Opinion Score (MOS) for every transmission policy and the sum of the Mean Opinion Score (MOS) of all the users is maximized, the optimizer will try to assign transmission policies with high estimated Mean Opinion Score (MOS) to the users with higher λ. This gives higher priority to the users, which have been receiving lower QoS up to the time of the optimization.

A common network performance metric is the throughput of the system. Traditionally, the goal of the network operator is to maximize the network throughput. By throughput the effective rate (goodput) $G_{ij}$ of a given user i at time j is considered:

$$G_{ij} = R_{ij} * (1-PEP) \quad (11)$$

with $R_{ij}$ being the actual transmission rate. The objective function for such an optimization model is to maximize the sum of the rate allocated to all the users in the system and is given with equation (12). Here the optimizer is not aware of the user perceived quality. The assumption is that if a user receives more data rate, then he also has a higher QoS.

For throughput maximization same set of decision variables as in equation (4)-(8) is used. The difference is the absence of the scaling parameter λ. Here one does not need scaling of the allocated transmission rate, because the transmission rates required by different applications are not comparable.

$$\text{Maximize} \sum_{i \in U} \sum_{j \in T_u} u_{ij} G_{ij} + \sum_{i \in V} \sum_{j \in T_v} v_{ij} G_{ij} + \sum_{i \in W} \sum_{j \in T_w} w_{ij} G_{ij} \quad (12)$$

Subject to:

$$\sum_{j \in T_u} u_{ij} = 1, \forall i \in U \quad (13)$$

$$\sum_{j \in T_v} v_{ij} = 1, \forall i \in V \quad (14)$$

$$\sum_{j \in T_w} w_{ij} = 1, \forall i \in W \quad (15)$$

$$\sum_{i \in U} \sum_{j \in T_u} r_{ij} u_{ij} + \sum_{i \in V} \sum_{j \in T_v} r_{ij} v_{ij} + \sum_{i \in W} \sum_{j \in T_w} r_{ij} w_{ij} \leq TotalSymbolRate \quad (16)$$

Figure 5A:
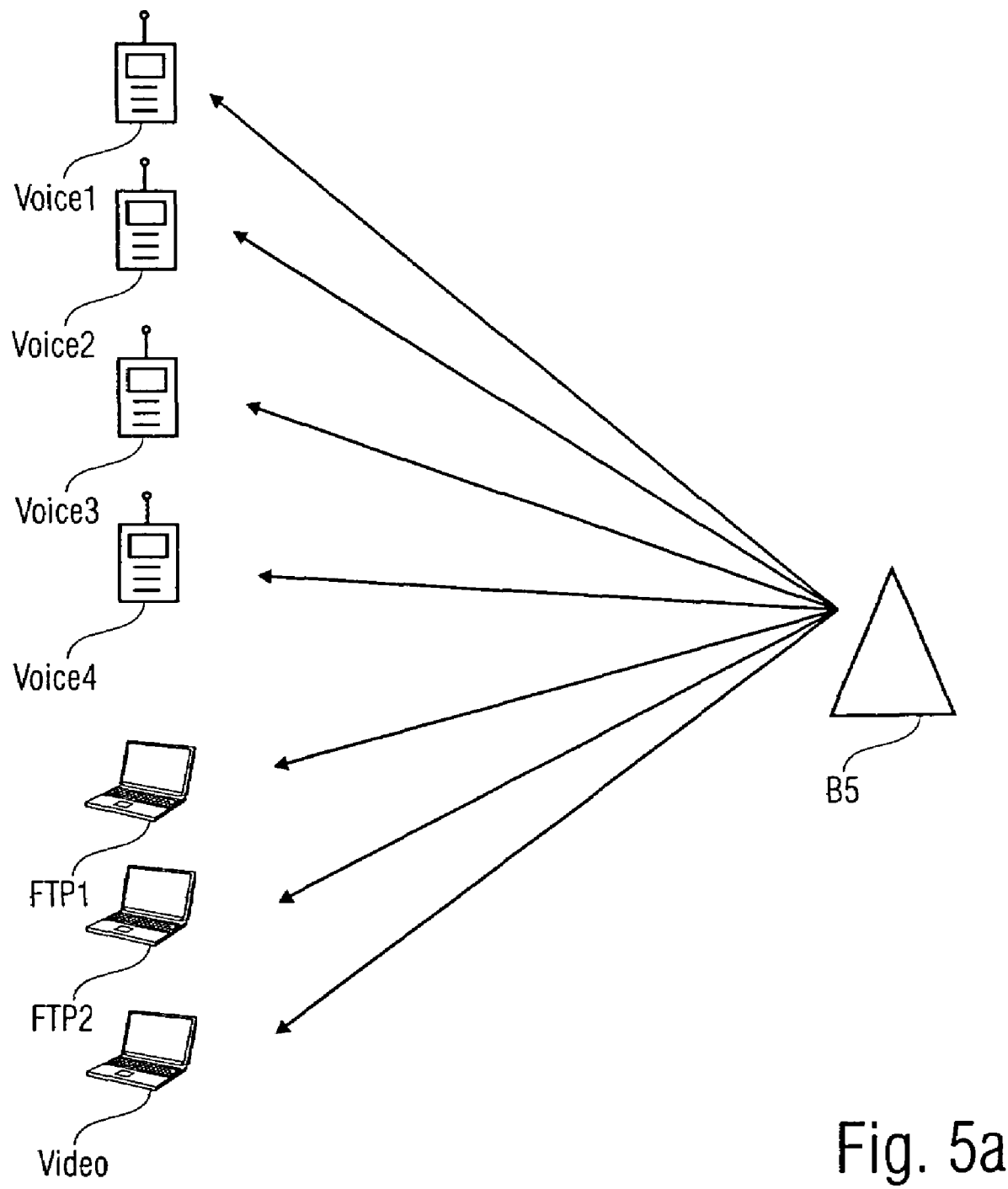
FIG. 5A is a diagram of a simulation set-up for the invention.

FIG. 5A shows a diagram of a simulation set-up to compare the performance and user perceived quality using said exemplary embodiment of said inventive method compared to a throughput maximization method. The simulations are done with the following parameters: four voice users, two male voice users Voice1, Voice2 and two female voice users Voice3, Voice4 are used.

The voice samples are 30 seconds long. The voice signal comes from the backbone network encoded with G.711 voice codec at 64 kbps. In the base station BS, following the optimization output, the signal could be transcoded to 6.4 kbps with G.723.1 codec, 15.2 kbps with iLBC codec, 24.6 kbps with Speex or it can be transmitted without transcoding at 64 kbps.

Two users FTP1, FTP2 subscribed for file download using FTP. Both of them have subscribed for a service with maximum offered transmission rate of 192 kbps.

One user video requests video-conferencing. The video sequence used is Foreman, encoded with H.264 encoder. The frame sequence is I-P-P-P- . . . -P, which is the appropriate format for real-time video.

The total available system rate is constant and three different cases are examined: 500 ksymbols/s, 700 ksymbols/s and 900 ksymbols/s. The supported modulation schemes are DBPSK (Differential SPSK) and DQPSK (Differential QPSK). Channel code rates of one-half, one-third, and one-forth are supported.

Because of the users' mobility, their received SNR for every optimization step is drawn randomly, according to the uniform distribution from a given interval. The system is active for 30 seconds and it is assumed that the average channel characteristics remain constant for 1.2 seconds, which results in 25 optimization loops.

In order to obtain the relationship between SNR and PEP, a rayleigh fading channel is simulated. For a particular combination of signal-to-noise ratio (SNR), modulation scheme (DBPSK or DOPSK) and channel coding rate (1/2, 1/3 or 1/4) the transmission of one million symbols over the channel is simulated. For this particular setting the residual Bit-Error-Rate (BER) after reception of the symbols at the receiver is computed. Based on the Sit error rate (BER) the packet error probability (PEP) is computed, using the application layer packet size. For the simulations 640 bits for the G.711 encoded packets, 304 bits for the iLBC encoded packets, 496 bits for SPEEX packets, 192 bits for G.723.1 packets, 640 bits for the FTP packets and 900 bits for the video packets are used.

The scaling parameter λ is calculated based on the expected MOS (not the actual MOS) of previous optimization steps. Thus, no feedback of application layer quality from the mobile terminals or users to the base station is assumed.

For the voice users, the signal samples are partitioned into 1.2 seconds and every sample is encoded with a voice codec, given from the optimization algorithm. At the end of the optimization loops, these voice samples are assembled into a single file and the perceived quality (MOS) is computed by comparing the original signal and the distorted one.

For the video user, if a slice is lost, it is not written in the bit stream, which tells the decoder to invoke the error concealment algorithm. The PSNR of every frame and the resulting average PSNR are computed. The average PSNR is converted to Mean Opinion Score (MOS) value using the relationship shown in FIG. 43.

Figure 5B:
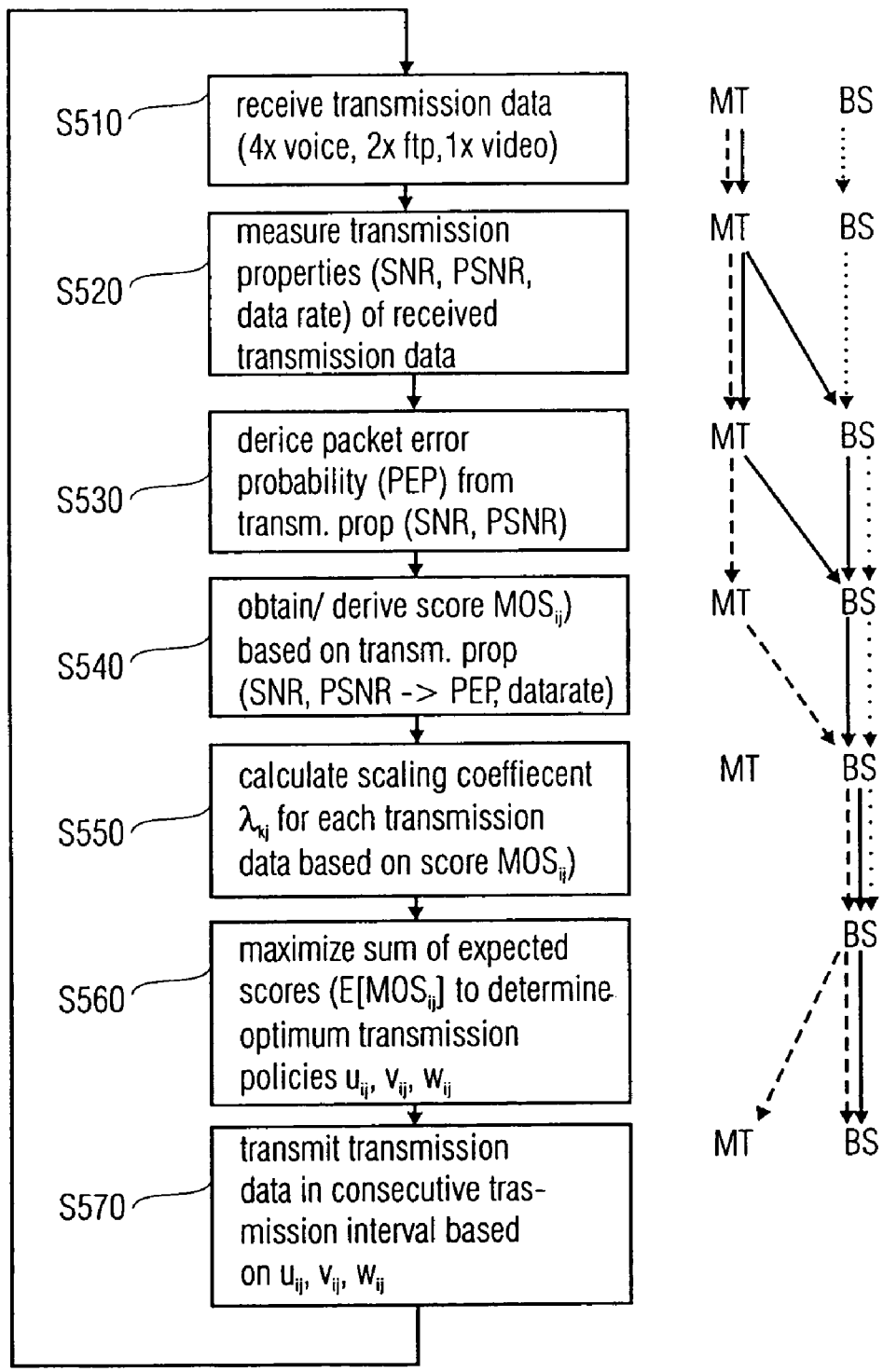
FIG. 5B is an embodiment of said inventive method used for the simulation set-up as shown in FIG. 5A.

FIG. 5B shows a flow chart of an exemplary embodiment of said inventive method used for the simulation set-up as shown in FIG. 5A. FIG. 5B shows seven steps S510 to 5570, which are performed repeatedly for the simulation.

In step S510 the seven mobile terminals—each "user" has one terminal and performs one application—receive the first to seventh transmission data (application data: 4×Voice, 2×FTP, 1×Video) associated to the first to seventh transmission (applications: 4×Voice, 2×FTP, 1×Video) being of a first to third transmissionion type (application type: Voice, FTP, Video).

In a consecutive step S520, the mobile terminals derive the transmission properties of the received transmission data for each single transmission independently: transmission rate, packet loss rate and/or signal to noise ratio. Based thereon the expected MOS for the different applications can be determined.

In step S530 the packet error probability (PEP) is derived based on the transmission properties of each transmission as described in [Ivr01]. This step can be either performed by the mobile terminal or the base station.

In step S540 the user perceived quality score (Mean Opinion Score $MOS_{ij}$) is obtained or derived based on the transmission properties on a transmission specific manner, i.e. for voice based on the packet error probability according to FIG. 2 or more generally expressed according to a look-up table 192 according to FIG. 1C, i.e. for FTP based on the packet error probability or packet loss and the data rate according to a look-up table according to FIG. 3 or 194 in FIG. 1C, i.e. for video based on packet error probability defined in a look-up table according to FIG. 4B or 196 according to FIG. 1C.

In step S550 the base station BS calculates the scaling or fairness coefficient $\lambda_{kj}$ (or in equation (4) $\lambda_{ui}, \lambda_{vi}, \lambda_{wi}$) for each transmission based on the historical scores ($MOS_{ki}$) according to the equations (9) and (10).

In step S560 the base station BS maximizes the sum of expected scores ($E[MOS_{ij}]$) to determine the optimum transmission scenario, i.e. the optimum combination of "individual" transmission policies $u_{ij}$ for voice, $v_{ij}$ for FTP, and $w_{ij}$ for video for each transmission.

In step S570, after having determined the optimum transmission policies, represented by $u_{ij}$, $v_{ij}$, and $w_{ij}$, and the respective transmission parameters for the application layer and the radio link layer (e.g. source codec, channel codec, modulation scheme) and the respective data rate available for each transmission, the base station transmits the transmission data (4×voice, 2×FTP, 1×video) in a consecutive transmission interval based on the determined transmission policies ($u_{ij}$, $v_{ij}$, $w_{ij}$).

After step S570, step 510 is again performed based on the newly transmitted data.

In the following a comparison between both investigated optimization approaches is done, The set-up described in the previous section is used and each simulation is run 600 times.

Figure 6:
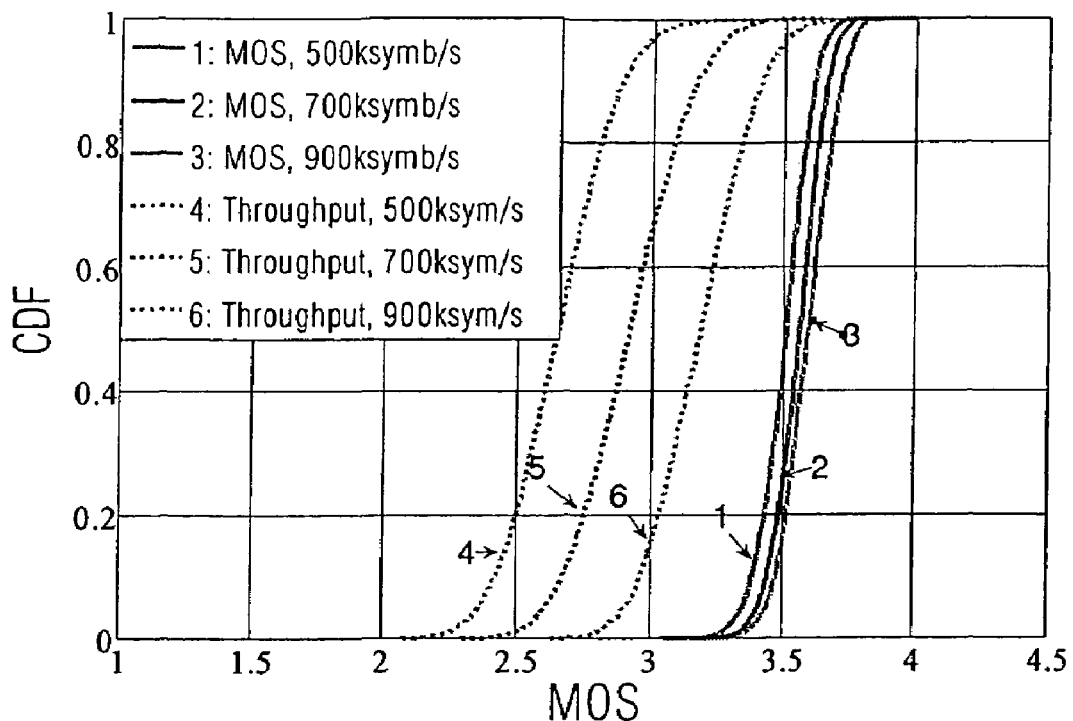
FIG. 6 is a diagram of Mean Opinion Scores (MOS) of voice users based on the simulation set-up according to FIG. 5A.

FIG. 6 presents the improvement of the voice user satisfaction for voice users Voice1 to Voice4 between the Mean Opinion Score (MOS) maximization, i.e. said embodiment of said inventive method according to FIG. 5A, and throughput maximization rate allocation schemes. At a total system rate of 500 ksymbols/s the average gain in terms of Mean Opinion Score (MOS) is 0.85. At 700 ksymbols/s the gain is still significant—0.6 and for 900 ksymbols/s it is around 0.4. The Mean Opinion Score (MOS) maximization scheme results in small improvement with the increase of the available transmission rate. This means that in case of scarce resources, it gives a good quality to the users.

Figure 7:
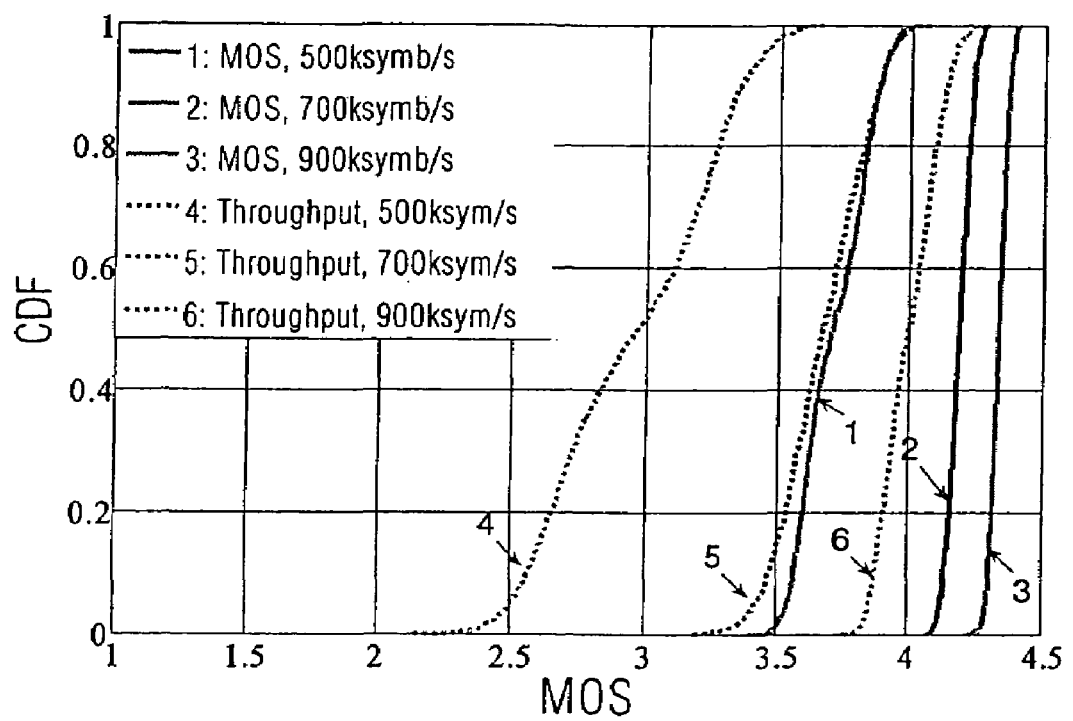
FIG. 7 is a diagram of Mean Opinion Scores (MOS) of file transfer protocol (FTP) users of the simulation set-up according to FIG. 5A.

FIG. 7 shows the gain for the FTP users, FTP1, FTP2. The Mean Opinion Score (MOS) maximization approach outperforms again the throughput maximization approach. Here the gain is lower, but it is still significant. For 500 ksymbols/s the gain is 0.7 MOS on the average, for 700 ksymbols/s it is 0.45 and for 900 ksymbols/s it is 0.3.

Figure 8:
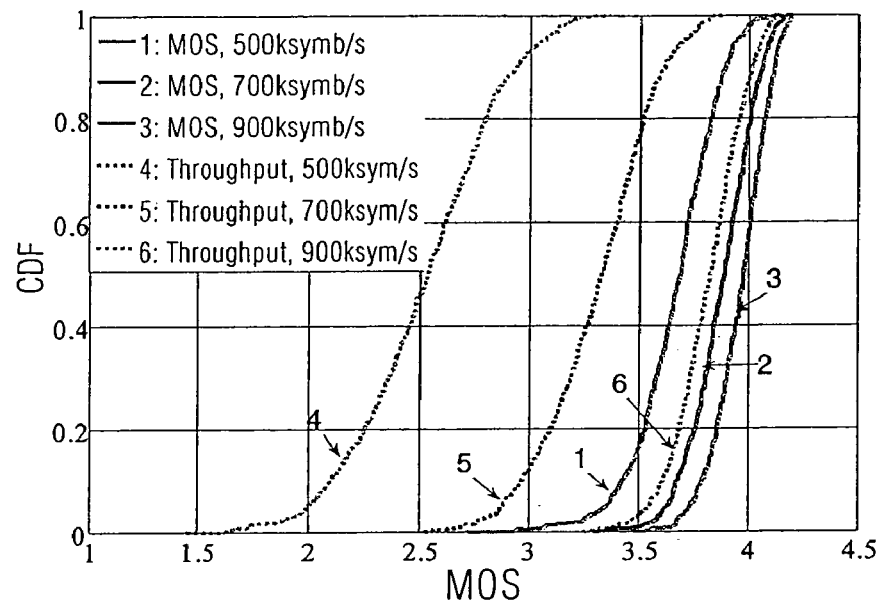
FIG. 8 is a diagram of Mean Opinion Scores (MOS) of video conferencing for the simulation set-up according to FIG. 5A.

FIG. 8 shows the video-conferencing quality improvement for video user Video. The gains in terms of MOS are similar to the case of the voice users Voice1 to Voice4 in FIG. 6 and with the increase of the available transmission rate the gain decreases.

For all the cases presented in the FIGS. 6-8, the MOS maximization has the advantage of offering lower spread of the QoS offered to the users. For example if one considers FIG. 6 for the case of a total system symbol rate of 500 ksymbols/s, the resulting MOS in 90% of the cases for the throughput maximization varies between MOS of 2 and 3.5, i.e. spread of 1.5 MOS. On the other hand the MOS maximization results in MOS variations between 3.4 and 4.1, i.e., a spread of only 0.7 MOS.

Figure 9:
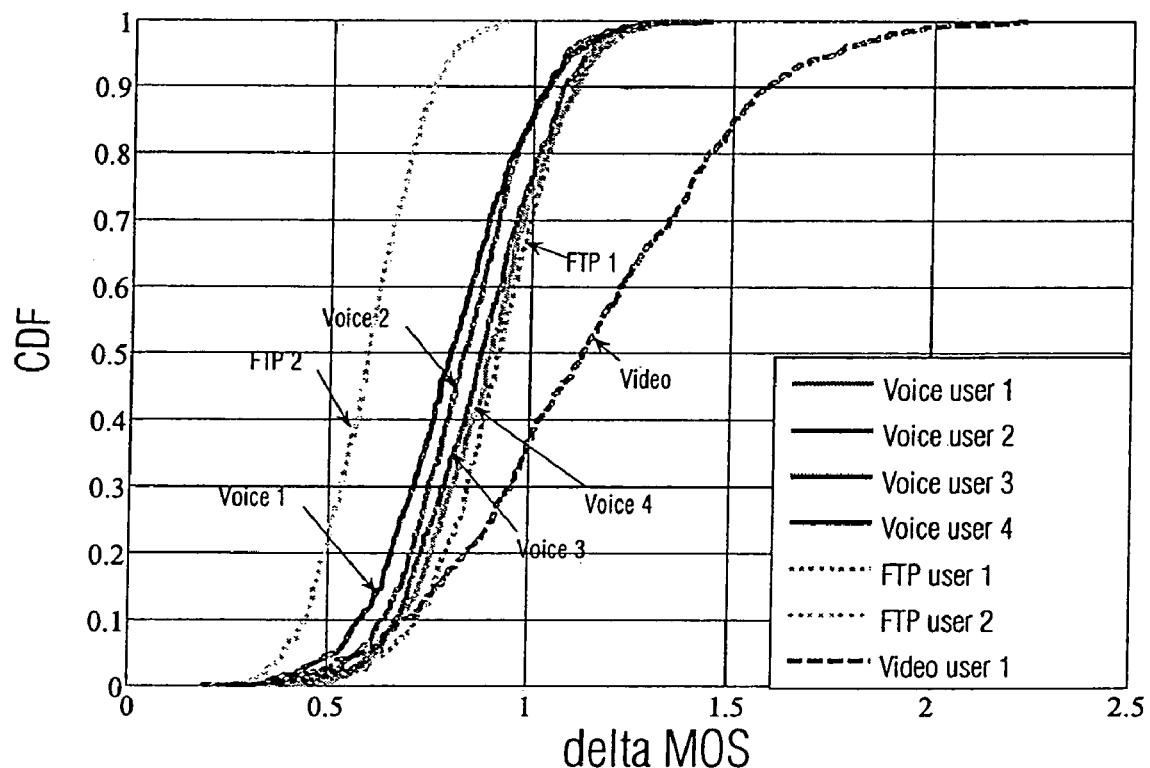
FIG. 9 is a Mean Opinion Score (MOS) gain per user for a simulation set-up according to FIG. 5A with a system symbol rate of 500 k symbols/s.
Figure 10:
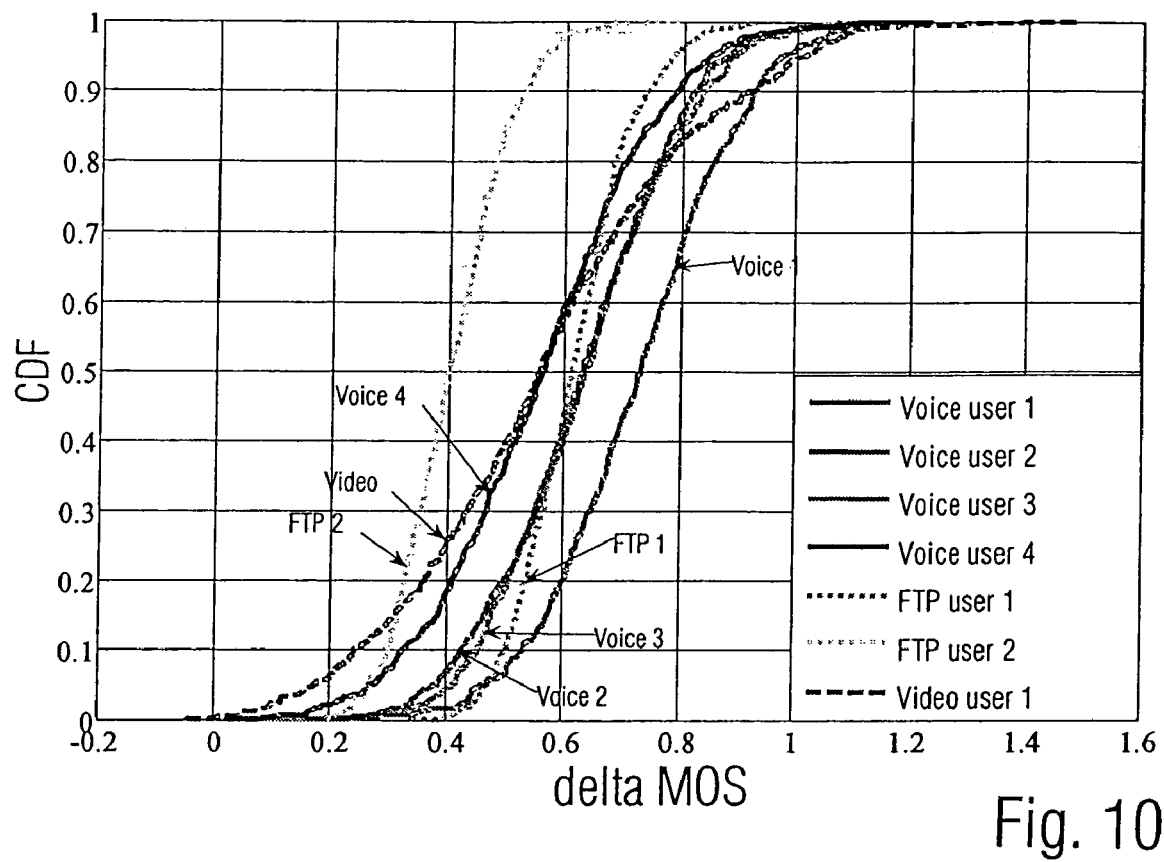
FIG. 10 is a diagram of Mean Opinion Score (MOS) gain per user for a simulation set-up according to FIG. 5A with a system symbol rate of 700 k symbols/s.
Figure 11:
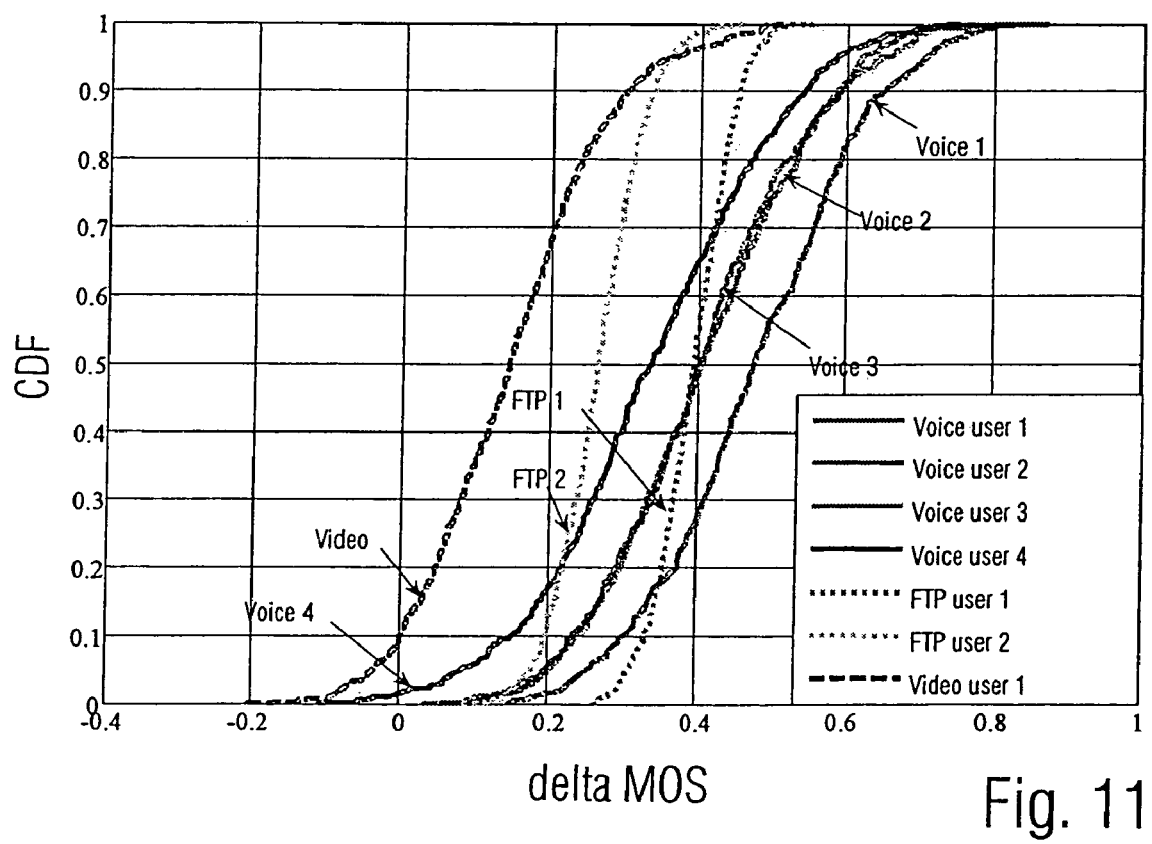
FIG. 11 is a diagram of a Mean Opinion Score (MOS) gain per user for a simulation set-up according to FIG. 5A with a system symbol rate of 900 k symbols/s.

In FIGS. 9 to 11 the voice users Voice1 to Voice4 are referred to as Voice users 1 to 4, the FTP users FTP1, FTP2 are referred to as FTP user 1, FTP user 2, and the video user Video as Video user 1.

FIGS. 9-11 present the gain per user in the system. The curves are produced as a difference between the MOS computed with MOS maximization and throughput maximization. Starting with a system symbol rate of 500 ksymbols/s (FIG. 9), in 50% of the simulations, the average gain for all users is 0.8. Exceptions are the video-conferencing user Video, who has even higher MOS gain and the FTP user 2, who has a lower gain. In the system with 700 ksymbols/s (FIG. 10) there are cases (1% for the user having videoconferencing) where the throughput maximization gives better results for a given user. This is even more visible in the case with system symbol rate 900 ksymbols/s (FIG. 11) when two users (the user having videoconferencing and the fourth voice user) have better performance in case of throughput maximization (10% of the cases). The mentioned users are the ones with the best channel with respect to received SNR. In case of MOS maximization, the optimizer takes resources from them to increase the Mean Opinion Score (MOS) of the users who have worse channels.

On the right hand side of the flow chart in FIG. 5B exemplary information flows between entities performing the task are depicted, wherein MT (Mobile Terminal) stands for entities like mobile terminals or users (e.g. Voice 1 to Voice 4, FTP1, FTP2, Video in FIG. 5A) and BS (Base Station) stands for the entities like base stations being responsible for the resource allocation (e.g. BS in FIG. 5A).

The continuous line arrows between the entities describe a first downlink scenario, wherein the mobile terminal MT transmits the transmission properties or derived packet error probability to the base station BS, i.e. performs the steps S510 to S530, or S510 to S520. Accordingly, the base station BS performs the steps S530 to S570 or S540 to S570, The broken line arrows between the entities describe a second downlink scenario, wherein the mobile terminal MT transmits the score to the base station BS, i.e. performs the steps S510 to 540. Accordingly, the base station BS performs only the steps S540 to S570.

The dotted line arrows describe an uplink scenario. An additional step after step S560 is required, at which the base station BS, after having determined the optimum transmission policies, transmits to each of the mobile terminals MT the respective transmission policy $u_{ij}$, $v_{ij}$, $w_{ij}$, based on which each of said mobile terminals then transmits the transmission data in the consecutive transmission interval.

Typically, preferred embodiments will be implemented such that only a minimum of the processing is done by mobile terminals, because they typically only have limited processing power compared to base stations, and perform the processing power intensive parts or steps at the base station. Thus, in a preferred scenario, the mobile terminal MT will only perform the steps S510 and S520, transmit the transmission properties to a base station BS and the base station BS performs the remaining steps S530 to S570.

Depending on the application or transmission type, the capability of mobile terminals MT to perform further steps, for example, S530 or S540, the decision about which entity performs which steps may be even done dynamically, for example, for each transmission.

Despite the fact that FIG. 5A only shows a down-link scenario, the invention is not limited to down-link scenarios, as described before, but can also be used for uplink scenarios and mixed uplink/downlink scenarios, for any number of users, applications and application types and also for users performing more than one application at the same time.

In another embodiment of the present invention a priority coefficient $w_k$ is used, the priority coefficient $w_k$ representing the relative importance of the user as determined, for example, by a service agreement between the user and the service provider, wherein k=1 ... K is one of the K users. In another embodiment, the priority coefficient will not only be user but also application specific, i.e. the service agreement defines not only a general application independent priority coefficient for the user but for each application a specific one. The user can subscribe to a service specific service level based on which an application priority coefficient, for example, for voice $w_{ui}$, for FTP $w_{vi}$, and for video $w_{vi}$ is derived. The priority coefficient can be either used instead of the fairness or scaling coefficient $\lambda_{ij}$ or in combination with the scaling coefficient $\lambda_{ij}$. Equation (17) shows the optimization function with a priority coefficient:

$$\text{Maximize} \sum_{i \in U} \sum_{j \in T_u} w_{ui} u_{ij} E[MOS_{ij}] + \qquad (17)$$

$$\sum_{i \in V} \sum_{j \in T_v} w_{vi} v_{ij} E[MOS_{ij}] + \sum_{i \in W} \sum_{j \in T_w} w_{wi} w_{ij} E[MOS_{ij}]$$

Alternatively to the scenario described in FIG. 5A, the inventive apparatus for determining transmission policies can also be usefully implemented in any other device, which is responsible or is allowed to take responsibility for allocating network or radio resources.

Despite the fact that the afore-mentioned description focuses on parameters from the application layer and radio link layer, as shown in FIG. 1C, alternative embodiments of the present invention may also comprise parameters from other layers, for example, the transport layer, or network layer.

To summarize the afore-mentioned discussion, the present invention provides an apparatus and method for determining transmission policies and a system that allows optimizing allocation of wireless network resources across multiple types of applications. In a preferred embodiment, the present invention proposes an optimization scheme based on the Mean Opinion Score (MOS) as the user perceived quality score and unifying or common metric. The Mean Opinion Score quantifies the satisfaction of the users for the service delivery. The invention can be used in any system dealing with the delivery of services over mobile communication networks.

The present invention will be of benefit to increase network capacity, i.e. provide services to a large number of users simultaneously, and improve the user perceived quality of service (QoS).

Using Mean Opinion Score (MOS) as the optimization parameter is helpful in different respects. First, this enables one to give an easy and straightforward measure of fairness. Second, as one is now on the same scale of application layer performance, this allows taking advantage of diversity at the application layer in addition to the diversity at the physical layer. In addition, this is likely to open up the possibility of a highly flexible framework for cross-layer optimization, such as adaptation of the application to the transport, network, data-link, and physical layer characteristics (bottom-up approach) and the adaptation of the physical, data link or network layers to the application requirements (top-down approach). In particular, the invention is of great benefit to the network operator as it allows improving user-perceived QoS and increasing network capacity by maximizing the number of users that can be serviced simultaneously.

Depending on certain implementation requirements of the inventive methods, the inventive methods can be implemented in hardware or in software. The implementation can be performed using a digital storage medium, in particular a disk, DVD, or a CD having electronically readable control signals stored thereon, which cooperate with a programmable computer system such that the inventive methods are performed. Generally, the present invention is, therefore, a computer program product with a program code stored on a machine-readable carrier, the program code being operative for performing the inventive methods when the computer program product runs on a computer. In other words, the inventive methods are, therefore, a computer program having a program code for performing at least one of the inventive methods when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. Apparatus for determining transmission policies for a plurality of applications of different types based
   on first transmission data associated to a first transmission being of a first application type having associated there with a first transmission type,
   on second transmission data associated to a second transmission being of a second application type having associated there with a second transmission type,
   comprising:
   a first score calculator for obtaining a first score within a common range, common in the sense of being common for all transmissions and transmission types, said first score being based on an evaluation of said first transmission data in a first transmission type specific manner and considering a user perceived quality of the first transmission;
   a second score calculator for obtaining a second score within the common range, said second score being based on an evaluation of said second transmission data in a second transmission type specific manner and considering a user perceived quality of the second transmission; and
   determiner for determining, based on said obtained scores, for said first and second transmission, a respective first and second transmission policy, each defining one or more transmission parameters such that a sum of a first expected score and a second expected score is maximized;
   wherein said determiner is operative to determine said first or second transmission policy based on a following function:

$$\text{Maximize} \sum_{i \in U} \sum_{j \in T_u} u_{ij} E[MOS_{ij}] + \sum_{i \in V} \sum_{j \in T_v} v_{ij} E[MOS_{ij}]$$

wherein $E[MOS_{ij}]$ is said respective expected score, wherein $u_{ij}$ is a decision variable of a first decision variable type each representing a possible first transmission policy, and wherein $v_{ij}$, is a decision variable of a second decision variable type each representing a possible second transmission policy.

2. Apparatus according to claim 1, wherein said first and second score calculator comprise a deriver for deriving said first or second score from one or more actual or expected first or second transmission properties.

3. Apparatus according to claim 1, wherein said first and second score calculator comprise a receiver for receiving said first or second score from a unit the first or second transmission data has been trans-mitted to.

4. Apparatus according to claim 2, wherein said deriver is operative to use a signal to noise ratio, a packet error probability or data rate as first or second transmission property.

5. Apparatus according to claim 2, wherein said deriver is operative to derive said first or second score from a first or second transmission property based on a predefined look-up table or predefined algorithm.

6. Apparatus according to claim 1, wherein said determiner is operative to determine said first and second transmission policy by defining a source coding type as a first or second transmission parameter.

7. Apparatus according to claim 1, wherein said determiner is operative to determine said first and second transmission policy by defining a channel coding type as a first or second transmission parameter.

8. Apparatus according to claim 1, wherein said determiner is operative to determine said first and second transmission policy by defining a modulation scheme type as first or second transmission parameter.

9. Apparatus for determining transmission policies for a plurality of applications of different types based
on first transmission data associated to a first transmission being of a first application type having associated there with a first transmission type,
on second transmission data associated to a second transmission being of a second application type having associated there with a second transmission type,
comprising:
   a first score calculator for obtaining a first score within a common range, common in the sense of being common for all transmissions and transmission types, said first score being based on an evaluation of said first transmission data in a first transmission type specific manner and considering a user perceived quality of the first transmission;
   a second score calculator for obtaining a second score within the common range, said second score being based on an evaluation of said second transmission data in a second transmission type specific manner and considering a user perceived quality of the second transmission; and
   a determiner for determining, based on said obtained scores, for said first and second transmission, a respective first and second transmission policy, each defining one or more transmission parameters such that a sum of a first expected score and a second expected score is maximized, wherein said determiner is operative to weight said first expected score with a first scaling coefficient and said second expected score with a second scaling coefficient when maximizing the sum of the respective expected scores, wherein said first scaling coefficient is based on a history of said first score and said second scaling coefficient is based on a history of said second score, and wherein the first and second scaling coefficient are the higher, the lower a value derived from the respective history is.

10. Apparatus according to claim 9, wherein said scaling coefficient is calculated by the following formula:

$$\lambda_{kj} = \frac{MaxMOS_j}{\sum_{i=1}^{j-1} MOS_{ki}}, k = 1 \ldots K \tag{10}$$

wherein $MaxMOS_j$ is derived by the following equation:

$$MaxMOS_j = \frac{1}{j-1} \max\left(\sum_{i=1}^{j-1} MOS_{1i}; \ldots; \sum_{i=1}^{j-1} MOS_{ki}; \ldots; \sum_{i=1}^{j-1} MOS_{Ki}\right)$$

and wherein $\lambda_{kj}$ is said scaling coefficient for a respective transmission k in a rate allocation step j, wherein k is a positive integer k=1 ... K, wherein K is the number of transmissions being a positive integer larger than 1, and $MOS_{ki}$ are the respective scores of the preceding rate allocation steps with i=1 ... (j−1) for the respective transmission.

11. Apparatus according to claim 9, wherein the determiner is operative to calculate a user-specific scaling coefficient based on the respective history of a plurality of transmissions associated with a user, and wherein said user-specific scaling coefficient is used to weight the respective scores associated with the user.

12. Apparatus according to claim 9, wherein said determiner is operative to determine said first or second transmission policy based on the following function:

$$\text{Maximize} \sum_{i \in U} \sum_{j \in T_u} \lambda_{ui} u_{ij} E[MOS_{ij}] + \sum_{i \in V} \sum_{j \in T_v} \lambda_{vi} v_{ij} E[MOS_{ij}] \tag{4}$$

wherein $\lambda_{ui}$ is said first scaling coefficient for a first transmission, $\lambda_{vi}$ is said second scaling coefficient for a second transmission, wherein $E[MOS_{ij}]$ is said respective expected score, wherein $u_{ij}$, is a decision variable of a first decision variable type each representing a possible first transmission policy, and wherein $v_{ij}$, is a decision variable of a second decision variable type each representing a possible second transmission policy.

13. Apparatus according to claim 1, wherein said determiner is operative to weight said first expected score with a first priority coefficient and said second expected score with a second priority coefficient when maximizing the sum of expected scores, wherein said first and second priority coefficient is based on a service level or relative priority compared to other users.

14. Method for determining transmission policies for a plurality of transmissions of different types based
on a first transmission data associated to a first transmission being of a first application type having associated there with a first transmission type,
on a second transmission data associated to a second transmission being of a second application type having associated there with a second transmission type,
comprising the following steps:
   obtaining a first score within a common range, common in the sense of being common for all transmissions and transmission types, said first score being based on an evaluation of said first transmission data in a first transmission type specific manner and considering a user perceived quality of the first transmission;

obtaining a second score within the common range, said second score being based on an evaluation of said second transmission data in a second transmission type specific manner and considering a user perceived quality of the second transmission; and determining, based on said assigned first and second score, for the first and second transmission a respective first and second transmission policy defining one or more transmission parameters such that a sum of a first and second expected score for a consecutive transmission interval is maximized;

wherein the step of determining said first or second transmission policy is based on a following function:

$$\text{Maximize} \sum_{i \in U} \sum_{j \in T_u} u_{ij} E[MOS_{ij}] + \sum_{i \in V} \sum_{j \in T_v} v_{ij} E[MOS_{ij}]$$

wherein $E[MOS_{ij}]$ is said respective expected score, wherein $u_{ij}$ is a decision variable of a first decision variable type each representing a possible first transmission policy, and wherein $v_{ij}$ is a decision variable of a second decision variable type each representing a possible second transmission policy.

15. A computer readable digital storage medium with a computer program stored thereon, the computer program having a program code for performing a method for determining transmission policies for a plurality of transmissions of different types based on a first transmission data associated to a first transmission being of a first application type having associated there with a first transmission type, on a second transmission data associated to a second transmission being of a second application type having associated there with a second transmission type, comprising the following steps:

obtaining a first score within a common range, common in the sense of being common for all transmissions and transmission types, said first score being based on an evaluation of said first transmission data in a first transmission type specific manner and considering a user perceived quality of the first transmission;

obtaining a second score within the common range, said second score being based on an evaluation of said second transmission data in a second transmission type specific manner and considering a user perceived quality of the second transmission; and determining, based on said assigned first and second score, for the first and second transmission a respective first and second transmission policy defining one or more transmission parameters such that a sum of a first and second expected score for a consecutive transmission interval is maximized, wherein the step of determining said first or second transmission policy is based on a following function:

$$\text{Maximize} \sum_{i \in U} \sum_{j \in T_u} u_{ij} E[MOS_{ij}] + \sum_{i \in V} \sum_{j \in T_v} v_{ij} E[MOS_{ij}]$$

wherein $E[MOS_{ij}]$ is said respective expected score, wherein $u_{ij}$ is a decision variable of a first decision variable type each representing a possible first transmission policy, and wherein $v_{ij}$ is a decision variable of a second decision variable type each representing a possible second transmission policy;

when the program runs on a computer.

16. Method for determining transmission policies for a plurality of transmissions of different types based on a first transmission data associated to a first transmission being of a first application type having associated there with a first transmission type, on a second transmission data associated to a second transmission being of a second application type having associated there with a second transmission type, comprising the following steps:

obtaining a first score within a common range, common in the sense of being common for all transmissions and transmission types, said first score being based on an evaluation of said first transmission data in a first transmission type specific manner and considering a user perceived quality of the first transmission;

obtaining a second score within the common range, said second score being based on an evaluation of said second transmission data in a second transmission type specific manner and considering a user perceived quality of the second transmission; and determining, based on said assigned first and second score, for the first and second transmission a respective first and second transmission policy defining one or more transmission parameters such that a sum of a first and second expected score for a consecutive transmission interval is maximized, wherein said determining comprises weighting said first expected score with a first scaling coefficient and said second expected score with a second scaling coefficient when maximizing the sum of the respective expected scores, wherein said first scaling coefficient is based on a history of said first score and said second scaling coefficient is based on a history of said second score, and wherein the first and second scaling coefficient are the higher, the lower a value derived from the respective history is.

17. A computer readable digital storage medium with a computer program stored thereon, the computer program having a program code for performing a method for determining transmission policies for a plurality of transmissions of different types based on a first transmission data associated to a first transmission being of a first application type having associated there with a first transmission type, on a second transmission data associated to a second transmission being of a second application type having associated there with a second transmission type, comprising the following steps:

obtaining a first score within a common range, common in the sense of being common for all transmissions and transmission types, said first score being based on an evaluation of said first transmission data in a first transmission type specific manner and considering a user perceived quality of the first transmission;

obtaining a second score within the common range, said second score being based on an evaluation of said second transmission data in a second transmission type specific manner and considering a user perceived quality of the second transmission; and determining, based on said assigned first and second score, for the first and second transmission a respective first and second transmission policy defining one or more transmission parameters such that a sum of a first and second expected score for a consecutive transmission interval is maximized, wherein said determining comprises weighting said first expected score with a first scaling coefficient and said second expected score with a second scaling coefficient when maximizing the sum of the respective expected scores, wherein said first scaling coefficient is based on a history of said first score and said second scaling coefficient is based on a history of said second score, and wherein the first and second scaling coefficient are the higher, the lower a value derived from the respective history is;

when the program runs on a computer.

* * * * *

UNITED STATES PATENT AND TRADEMARK OFFICE
CERTIFICATE OF CORRECTION

| | |
|---|---|
| PATENT NO. | : 7,668,191 B2 |
| APPLICATION NO. | : 11/638836 |
| DATED | : February 23, 2010 |
| INVENTOR(S) | : Steinbach et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 562 days.

Signed and Sealed this

Seventh Day of December, 2010

David J. Kappos
*Director of the United States Patent and Trademark Office*